US012583782B2

(12) United States Patent
Urata

(10) Patent No.: US 12,583,782 B2
(45) Date of Patent: Mar. 24, 2026

(54) OPTICAL FIBER PREFORM

(71) Applicant: Shin-Etsu Chemical Co., Ltd., Tokyo (JP)

(72) Inventor: Yuhei Urata, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 784 days.

(21) Appl. No.: 17/367,649

(22) Filed: Jul. 6, 2021

(65) Prior Publication Data

US 2022/0009816 A1 Jan. 13, 2022

(30) Foreign Application Priority Data

Jul. 7, 2020 (JP) ................................. 2020-117338
Jun. 2, 2021 (JP) ................................. 2021-093119

(51) Int. Cl.
*C03B 37/018* (2006.01)

(52) U.S. Cl.
CPC .............................. *C03B 37/01815* (2013.01)

(58) Field of Classification Search
None
See application file for complete search history.

(56) References Cited

U.S. PATENT DOCUMENTS

| | | | |
|---|---|---|---|
| 5,058,976 A | 10/1991 | Digiovanni | |
| 6,625,360 B2 * | 9/2003 | Kyogoku | ................. G02B 6/02 |
| | | | 385/127 |
| 2012/0057834 A1 | 3/2012 | Oyamada | |
| 2016/0176749 A1 | 6/2016 | Terashima | |

FOREIGN PATENT DOCUMENTS

| | | |
|---|---|---|
| JP | S6227343 A | 2/1987 |
| JP | S62182132 A | 8/1987 |
| JP | S638707 A | 1/1988 |
| JP | H04273187 A | 9/1992 |
| JP | H0517164 A | 1/1993 |
| JP | 2001296445 A | 10/2001 |
| JP | 2012078804 A | 4/2012 |
| JP | 2016117616 A | 6/2016 |

OTHER PUBLICATIONS

Office Action issued for counterpart Japanese Application No. 2021-093119, transmitted from the Japanese Patent Office on Mar. 5, 2024 (drafted on Feb. 29, 2024).

* cited by examiner

*Primary Examiner* — Shawn Mckinnon

(57) ABSTRACT

The present invention provides an optical fiber with improved optical properties such as zero dispersion wavelength by suppressing the volatilization of dopant materials such as germanium dioxide and optimizing the refractive index distribution by adjusting the setting position of the core portion burner for deposition in a larger optical fiber preform. An optical fiber preform includes a core portion with a relatively high refractive index and a clad portion with a relatively low refractive index, wherein a position having a value of 45% of a refractive index difference between a center of the core portion and the clad portion is a boundary rcore (mm) between the core portion and the clad portion; and when a radius position r at which a refractive index difference with the clad portion being a maximum value is rside (mm), rside/rcore is 0.745 to 1.

5 Claims, 3 Drawing Sheets

21a 21b
21c

21d

21e

21f

20

OPTICAL FIBER PREFORM

The contents of the following Japanese patent application are incorporated herein by reference:
NO. 2020-117338 filed in JP on Jul. 7, 2020
NO. 2021-093119 filed in JP on Jun. 2, 2021

BACKGROUND

1. Technical Field

The present invention relates to an optical fiber preform that becomes an optical fiber when it is drawn.

2. Related Art

In recent years, the demand for optical fibers has been increasing due to the increase in data communication volume, and there is a need for larger optical fiber preforms to meet the increasing demand. An ordinary optical fiber for communication consists of a core portion with a high refractive index and a clad portion with a relatively low refractive index around its periphery.

When optical fiber glass preform is produced by the VAD method, a core portion burner for deposition is used to deposit and form the core portion, and a clad portion burner for deposition is used to deposit and form the clad portion on the outside of the core portion. Glass raw materials are supplied to each burner along with combustible gas for flame formation, and porous optical fiber glass preform is produced by depositing glass fine particles generated in the flame emanating from the burner. The produced porous glass preform is heated to about 1200° C. in a chlorine-containing gas atmosphere to remove water and OH groups (called dehydration) contained therein and further heated to about 1500° C. in an inert gas atmosphere to make transparent glass, which is used as the optical fiber glass preform. The optical fiber produced in this manner can be obtained by heating the optical fiber glass preform thus prepared to about 2000° C. to soften it, and then stretching it to a narrow diameter (called wire drawing).

A common producing method for optical fiber preform is to produce a core glass rod consisting of a part of a core portion and a clad portion, and then to add the remaining clad portion to the outside of the core glass rod to make the final optical fiber preform in two steps. In the VAD method, which is one of the producing methods of core glass rods, a core glass rod is produced using a core portion burner for deposition for depositing and forming the core portion and at the same time using a clad portion burner for deposition for depositing and forming the clad portion on the outside of the core portion. Glass raw materials are supplied to each burner along with combustible gas for flame formation, and a core soot body is produced by depositing glass fine particles generated in the flame emanating from the burner. At this time, dopant materials are also supplied to the core burner for deposition, so that the flame emanating from the core burner for deposition produces glass fine particles containing dopants.

The core soot body is heat-treated by a heater to remove impurities and make transparent glass. Here, impurities are removed by flowing a gas containing chlorine atoms into the atmosphere gas while heating the core soot body at a temperature of about 1000-1200° C. Then the impurity metal elements and hydroxyl groups (OH groups) are removed. After that, the heater setting temperature is raised to about 1400-1500° C. and heat treatment is applied to turn the core soot body into transparent glass to make transparent core glass rod. After that, the remaining clad portions are added to the periphery of the core glass rod to produce the final optical fiber preform. The optical fiber can be obtained by heating the optical fiber preform to about 2000° C. to soften it and then stretching it to a narrow diameter (called "wire drawing"). Note that if metal element impurities and hydroxyl groups (OH groups) remain unremoved when the core soot body is thermal-treated, it will cause an increase in the transmission loss of the optical fiber.

In order to produce large optical fiber preforms, the core glass rods produced by the VAD method are made larger. One method to enlarge the core glass rod is to increase the flow rate of the feedstock and combustible gas supplied to the core burner for deposition and the clad burner for deposition. However, the larger size of the core soot body, especially the larger diameter, increases the distance between the surface of the core soot body and the center portion of the core soot body, which tends to result in insufficient heating of the center portion of the core soot body when thermal treatment is performed. If sufficient heating is not applied to the center portion of the core soot body, the removal of metallic impurities and OH groups will be insufficient, and the transmission loss of the optical fiber will increase. In order to provide sufficient heating to the center portion of the core soot body, it is necessary to extend the heating time and increase the heater setting temperature. However, the longer the heating time, the lower the productivity. If the heater setting temperature is set too high, the germanium dioxide added to increase the refractive index of the core portion tends to volatilize during processing, resulting in a smaller refractive index difference between the core portion and clad portion, which deteriorates the optical properties of the desired optical fiber, such as zero dispersion wavelength.

In view of these problems, the present invention aims to provide optical fibers with improved optical properties such as zero dispersion wavelength by suppressing the volatilization of dopant materials such as germanium dioxide and optimizing the refractive index distribution by adjusting the setting position of the core portion burner for deposition in a larger optical fiber preform.

General Disclosure

The present invention relates to an optical fiber preform that solves such a problem. The optical fiber preform has a core portion with a relatively high refractive index and a clad portion with a relatively low refractive index. When the position where the refractive index difference between the center of the core portion and the clad portion has a value of 45% is defined as the boundary $r_{core}$ (mm) between the core portion and clad portion, and when $r_{side}$ (mm) is defined as the radius position r in the core portion with the refractive index difference being the maximum value in the region where the radius position r is between 0.5 $r_{core}$ to 1.0 $r_{core}$, $r_{side}/r_{core}$ is 0.745 or more.

The optical fiber preform according to the present invention has a $r_{side}/r_{core}$ of 0.745 or more, which can improve the zero dispersion wavelength of the optical fiber obtained by wire drawing the preform.

DESCRIPTION OF EXEMPLARY EMBODIMENTS

In the present invention, as a result of intensive research, by adjusting the flow rate ratio of carrier gas and silicon tetrachloride to 0.79 or less, preferably 0.39 to 0.73, and adjusting the flow rate of sealing gas and silicon tetrachloride to 2.7 or less, preferably 1.5 to 2.5, a position where the refractive index difference between the center of the core portion and the clad portion has a value of 45%, is set as the boundary $r_{core}$ (mm) between the core portion and the clad portion, and when the radius position r, with the refractive index difference being the maximum value in the region of the core portion where the radius position r is between 0.5 $r_{core}$ to 1.0 $r_{core}$, is $r_{side}$ (mm), when $r_{side}/r_{core}$ is 0.745 or more, it could be found that the optical properties of the optical fiber obtained by wire drawing the preform become desirable. Note that if the value of $r_{side}/r_{core}$ is 0.745 or less, the zero dispersion wavelength is 1318.9 nm or more, which is not desirable. Note that $r_{side}$ and $r_{core}$ are defined as follows. The refractive index of the clad portion at a position of 47.5% of the outer diameter of the optical fiber preform is used as the reference for the refractive index difference (0.0), and the refractive index difference from the clad portion at the center of the core portion is further set at a refractive index ratio of 1.0. The radius position at which the refractive index ratio becomes 0.45 is considered to be the boundary between the core portion and the clad portion, and this position is defined as the core radius $r_{core}$ (mm) The radius position r of the core portion where the radius position r is the maximum value in the range of 0.5 $r_{core}$ to 1.0 $r_{core}$ was defined as $r_{side}$ (mm) (refer to FIG. 3).

Figure 1:
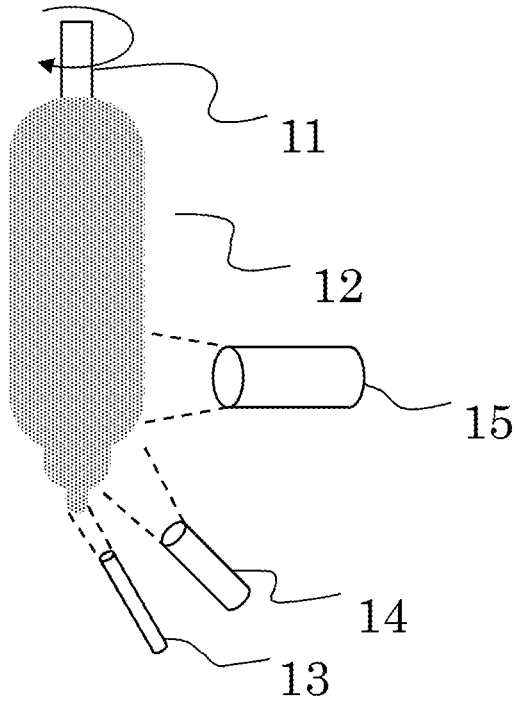
FIG. 1 illustrates a schematic view schematically showing the production of glass fine particulate deposits using a total of three burners.

The following is a description of the present invention through exemplary embodiments and comparative examples based on the drawings, but the present invention is not limited to these, and various forms are possible. FIG. 1 shows a schematic view of the glass fine particle deposit being produced. The core portion burner for deposition 13, depicted at the bottom, is provided independently of the clad portion burners for deposition 14 and 15 in order to accompany dopant materials such as germanium tetrachloride in addition to silicon tetrachloride, and a plurality of burners are often arranged as a whole to produce soot. After the core portion is deposited on the starting material located at the center, the clad portion is formed by the clad portion burner for deposition arranged above it to cover the core portion from the outside.

Figure 2:
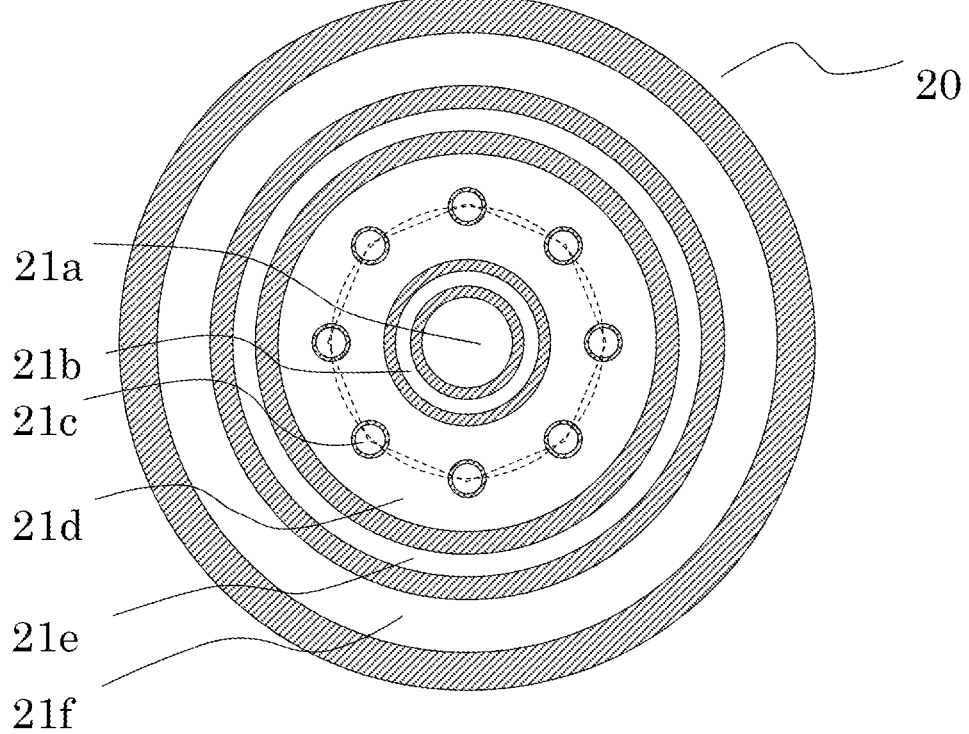
FIG. 2 illustrates a schematic view showing a cross-sectional structure of the first clad portion depositing burner and the second clad portion depositing burner.

[Exemplary embodiment] [Exemplary embodiment 1] In exemplary embodiment 1, a total of three burners, a core portion burner for deposition 13 and a burner 20, whose cross-sectional shape is shown in FIG. 2, which is used as the first clad portion depositing burner 14 and the second clad portion depositing burner 15, were used to produce core soot bodies under the following conditions. A concentric quadruple burner was used in the core portion burner for deposition, with 0.32 L/min of silicon tetrachloride, 15 mL/min of germanium tetrachloride, and 0.19 L/min of argon as the carrier gas flowing through the central pipe. 6.2 L/min of hydrogen flowed through the second pipe from the center, 0.75 L/min of argon as sealing gas flowed through the third pipe, and 10.2 L/min of oxygen flowed through the outermost pipe. Herein, the flow rate ratio of argon to silicon tetrachloride as carrier gas is 0.59, and the flow rate ratio of argon to silicon tetrachloride as sealing gas is 2.3. The horizontal distance from the soot of the core portion burner for deposition is increased by 1.0 mm compared to a comparative example 1 described below.

Silicon tetrachloride 0.80 L/min and oxygen 0.66 L/min were flowed into the nozzle 21a of the first clad portion depositing burner. In addition, 32 L/min of hydrogen flowed to nozzle 21d, 18 L/min of oxygen flowed to nozzle 21f, and a total of 1.5 L/min of oxygen flowed to the small diameter nozzle group 21c. On the other hand, the nozzles 21a of the second clad portion depositing burner were set to 4.8 L/min of silicon tetrachloride and 3.6 L/min of oxygen, while 65 L/min of hydrogen flowed to nozzle 21d, 31 L/min of oxygen flowed to nozzle 21f, and a total of 6.2 L/min of oxygen flowed to the small diameter nozzle group 21c.

The outer diameter of the core soot body produced was 230 mm. This was heated to around 1200° C. in a reactor core pipe containing chlorine gas to dehydrate it, and then heated to around 1550° C. in a reactor core pipe containing helium gas to turn it into transparent glass. The outer diameter of the obtained core glass rod was 108 mm.

Figure 3:
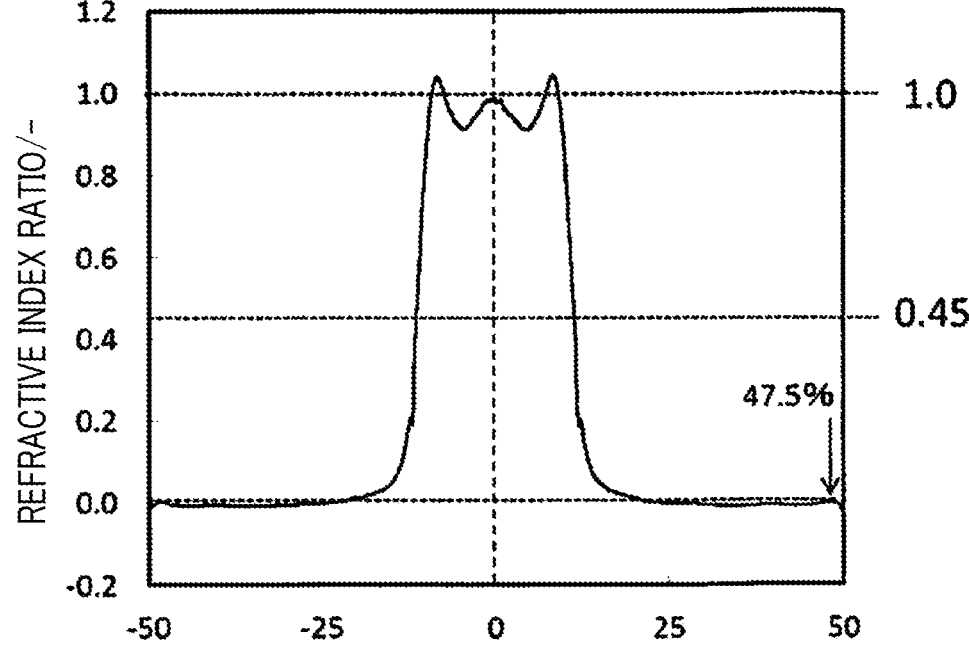
FIG. 3 illustrates a reference of a refractive index difference of the refractive index distribution of the optical fiber preform describing using an exemplary embodiment 1.

The refractive index distribution of the optical fiber preform produced using the obtained core glass rods was measured using a preform analyzer, and as the result, the obtained $r_{side}/r_{core}$ value was 0.745. Note that the value of $r_{side}/r_{core}$ was calculated according to the following. First, as shown in FIG. 3, the refractive index of the clad portion at a position of 47.5% of the outer diameter of the optical fiber preform is set as the reference for the refractive index difference (0.0), and further, the refractive index difference from the clad portion at the center of the core portion is set at a refractive index ratio of 1.0. The radius position at which the refractive index ratio becomes 0.45 is considered to be the boundary between the core portion and the clad portion, and this position is defined as the core radius $r_{core}$ (mm). The radius position r of the core portion where the radius position r is the maximum value in the range of 0.5 $r_{core}$ to 1.0 $r_{core}$ was defined as $r_{side}$ (mm), and the ratio $r_{side}/r_{core}$ was obtained. The mode field diameter and zero dispersion wavelength of the optical fiber obtained by wire drawing the preform were 9.13 μm and 1318.1 nm, respectively.

[Exemplary embodiment 2] The core soot body was produced under the following conditions using a total of three burners as in the exemplary embodiment 1. That is, a concentric quadruple burner was used in the core portion burner for deposition, with 0.40 L/min of silicon tetrachloride, 17.5 mL/min of germanium tetrachloride, and 0.29 L/min of argon as the carrier gas flowing through the central pipe. 7.0 L/min of hydrogen flowed through the second pipe from the center, 1.0 L/min of argon as sealing gas flowed through the third pipe, and 10.2 L/min of oxygen flowed through the outermost pipe. Herein, the flow rate ratio of argon to silicon tetrachloride as carrier gas is 0.73, and the flow rate ratio of argon to silicon tetrachloride as sealing gas is 2.5. The horizontal distance from the soot of the core portion burner for deposition is increased by 1.0 mm compared to a comparative example 1 described below. Silicon tetrachloride 0.77 L/min and oxygen 0.65 L/min were flowed into the nozzle 21a of the first clad portion depositing burner. In addition, 33 L/min of hydrogen flowed to nozzle 21d, 19 L/min of oxygen flowed to nozzle 21f, and a total of 1.5 L/min of oxygen flowed to the small diameter nozzle group 21c. On the other hand, the nozzles 21a of the second clad portion depositing burner were set to 5.0 L/min of silicon tetrachloride and 3.7 L/min of oxygen, while 69 L/min of hydrogen flowed to nozzle 21*d,* 30 L/min of oxygen flowed to nozzle 21*f,* and a total of 6.5 L/min of oxygen flowed to the small diameter nozzle group 21*c.*

The outer diameter of the core soot body produced was 235 mm. This was heated to around 1200° C. in a reactor core pipe containing chlorine gas to dehydrate it, and then heated to around 1550° C. in a reactor core pipe containing helium gas to turn it into transparent glass. The outer diameter of the obtained core glass rod was 110 mm.

The refractive index distribution of the optical fiber preform produced by the above described conditions was measured using a preform analyzer, and as the result, the obtained $r_{side}/r_{core}$ value was 0.831. The mode field diameter and zero dispersion wavelength of the optical fiber produced by wire drawing the preform were 9.15 µm and 1317.8 nm, respectively.

Exemplary embodiment 31 The core soot body was produced under the following conditions using a total of three burners as in the exemplary embodiment 1. That is, a concentric quadruple burner was used in the core portion burner for deposition, with 0.49 L/min of silicon tetrachloride, 18.0 mL/min of germanium tetrachloride, and 0.19 L/min of argon as the carrier gas flowing through the central pipe. 6.7 L/min of hydrogen flowed through the second pipe from the center, 0.73 L/min of argon as sealing gas flowed through the third pipe, and 10.2 L/min of oxygen flowed through the outermost pipe. Herein, the flow rate ratio of argon to silicon tetrachloride as carrier gas is 0.39, and the flow rate ratio of argon to silicon tetrachloride as sealing gas is 1.5. The distance from the soot of the core portion burner for deposition is the same as in the comparative example 1, as described below. Silicon tetrachloride 0.77 L/min and oxygen 0.65 L/min were flowed into the nozzle 21*a* of the first clad portion depositing burner. In addition, 31 L/min of hydrogen flowed to nozzle 21*d,* 17.5 L/min of oxygen flowed to nozzle 21*f,* and a total of 1.4 L/min of oxygen flowed to the small diameter nozzle group 21*c.* On the other hand, the nozzles 21*a* of the second clad portion depositing burner were set to 5.3 L/min of silicon tetrachloride and 3.6 L/min of oxygen, while 72 L/min of hydrogen flowed to nozzle 21*d,* 28 L/min of oxygen flowed to nozzle 21*f,* and a total of 6.9 L/min of oxygen flowed to the small diameter nozzle group 21*c.*

The outer diameter of the core soot body produced was 225 mm. This was heated to around 1200° C. in a reactor core pipe containing chlorine gas to dehydrate it, and then heated to around 1550° C. in a reactor core pipe containing helium gas to turn it into transparent glass. The outer diameter of the obtained core glass rod was 104 mm.

The refractive index distribution of the optical fiber preform produced by the above described conditions was measured using a preform analyzer, and as the result the obtained $r_{side}/r_{core}$ value was 0.767. The mode field diameter and zero dispersion wavelength of the optical fiber produced by wire drawing the preform were 9.17 µm and 1318.3 nm, respectively.

[Exemplary embodiment 4] The core soot body was produced under the following conditions using a total of three burners as in the exemplary embodiment 1. The silicon tetrachloride flow rate of the core portion burner for deposition was set to 0.44 L/min, germanium tetrachloride was set to 20.0 mL/min, argon flow rate as the carrier gas was set to 0.19 L/min, and argon as the sealing gas was set to 0.70 L/min. Herein, the flow rate ratio of argon to silicon tetrachloride as carrier gas is 0.43, and the flow rate ratio of argon to silicon tetrachloride as sealing gas is 1.6. The horizontal distance from the soot of the core portion burner for deposition is increased by 2.0 mm compared to a comparative example 1 described below. The other conditions are the same as in the exemplary embodiment 1.

The refractive index distribution of the optical fiber preform produced by the above described conditions was measured using a preform analyzer, and as the result. the obtained $r_{side}/r_{core}$ value was 0.809. The mode field diameter and zero dispersion wavelength of the optical fiber produced by wire drawing the preform were 9.09 µm and 1317.5 nm, respectively.

[Comparative example 1] As a comparative example 1, core soot bodies were produced under the following conditions using a total of three burners, a core portion burner for deposition 13 and a burner 20 which is used as the first clad portion depositing burner 14 and the second clad portion depositing burner 15. That is, a concentric quadruple burner was used in the core portion burner for deposition, with 0.48 L/min of silicon tetrachloride, 19 mL/min of germanium tetrachloride, and 0.38 L/min of argon as the carrier gas flowing through the central pipe. 6.8 L/min of hydrogen flowed through the second pipe from the center, 1.3 L/min of argon as sealing gas flowed through the third pipe, and 10.1 L/min of oxygen flowed through the outermost pipe. Herein, the flow rate ratio of argon to silicon tetrachloride as carrier gas is 0.79, and the flow rate ratio of argon to silicon tetrachloride as sealing gas is 2.7. Silicon tetrachloride 0.80 L/min and oxygen 0.66 L/min were flowed into the nozzle 21*a* of the first clad portion depositing burner. In addition, 30 L/min of hydrogen flowed to nozzle 21*d,* 18 L/min of oxygen flowed to nozzle 21*f,* and a total of 1.5 L/min of oxygen flowed to the small diameter nozzle group 21*c.* On the other hand, the nozzles 21*a* of the second clad portion depositing burner were set to 4.8 L/min of silicon tetrachloride and 3.6 L/min of oxygen, while 65 L/min of hydrogen flowed to nozzle 21*d,* 31 L/min of oxygen flowed to nozzle 21*f,* and a total of 6.2 L/min of oxygen flowed to the small diameter nozzle group 21*c.*

The outer diameter of the core soot body produced was 229 mm. This was heated to around 1200° C. in a reactor core pipe containing chlorine gas to dehydrate it, and then heated to around 1550° C. in a reactor core pipe containing helium gas to turn it into transparent glass. The outer diameter of the obtained core glass rod was 107 mm.

The refractive index distribution of the optical fiber preform produced by the above described conditions was measured using a preform analyzer, and as the result, the obtained $r_{side}/r_{core}$ value was 0.660. The mode field diameter and zero dispersion wavelength of the optical fiber produced by wire drawing the preform were 9.12 µm and 1319.1 nm, respectively.

[Comparative example 2] As a comparative example 2, a total of three burners, a core portion burner for deposition 13 and a burner 20, whose cross-sectional shape is shown in FIG. 2, which is used respectively as the first clad portion depositing burner 14 and the second clad portion depositing burner 15, were used to produce core soot bodies under the following conditions. That is, a concentric quadruple burner was used in the core portion burner for deposition, with 0.22 L/min of silicon tetrachloride, 13 mL/min of germanium tetrachloride, and 0.18 L/min of argon as the carrier gas flowing through the central pipe. 4.5 L/min of hydrogen flowed through the second pipe from the center, 1.3 L/min of argon as sealing gas flowed through the third pipe, and 9.5 L/min of oxygen flowed through the outermost pipe. Herein, the flow rate ratio of argon to silicon tetrachloride as carrier gas is 0.82, and the flow rate ratio of argon to silicon tetrachloride as sealing gas is 5.9. The horizontal distance from the soot of the core portion burner for deposition is decreased by 0.5 mm compared to a comparative example 1 described above. Silicon tetrachloride 0.80 L/min and oxygen 0.66 L/min were flowed into the nozzle 21a of the first clad portion depositing burner. In addition, 30 L/min of hydrogen flowed to nozzle 21d, 18 L/min of oxygen flowed to nozzle 21f, and a total of 1.5 L/min of oxygen flowed to the small diameter nozzle group 21c. On the other hand, the nozzles 21a of the second clad portion depositing burner were set to 4.8 L/min of silicon tetrachloride and 3.6 L/min of oxygen, while 65 L/min of hydrogen flowed to nozzle 21d, 31 L/min of oxygen flowed to nozzle 21f, and a total of 6.2 L/min of oxygen flowed to the small diameter nozzle group 21c.

The outer diameter of the core soot body produced was 230 mm. This was heated to around 1200° C. in a reactor core pipe containing chlorine gas to dehydrate it, and then heated to around 1550° C. in a reactor core pipe containing helium gas to turn it into transparent glass. The outer diameter of the obtained core glass rod was 110 mm.

The refractive index distribution of the optical fiber preform produced by the above described conditions was measured using a preform analyzer, and as the result the obtained $r_{side}/r_{core}$ value was 0.703. The mode field diameter and zero dispersion wavelength of the optical fiber produced by wire drawing the preform were 9.11 μm and 1318.9 nm, respectively.

The results of the above exemplary embodiments 1 to 4 and comparative examples 1 and 2 are shown in Table 1. According to Table 1, the $r_{side}/r_{core}$ values of the optical fiber preforms of exemplary embodiments 1 to 4, where the flow rate ratio of argon and silicon tetrachloride as carrier gas flowed into the core portion burner for deposition was 0.79 or less and the flow rate ratio of argon and silicon tetrachloride as sealing gas was 2.7 or less, were 0.745 or more. The zero dispersion wavelength of the optical fiber obtained from the optical fiber preform of exemplary embodiments 1 to 4 was 1318.9 nm or less, which was excellent in terms of optical properties. On the other hand, the $r_{side}/r_{core}$ values of the optical fiber preforms of comparative examples 1 to 4, where the flow rate ratio of argon and silicon tetrachloride as carrier gas flowed into the core portion burner for deposition was 0.79 or more and the flow rate ratio of argon and silicon tetrachloride as sealing gas was 2.7 or more, were 0.745 or less. The zero dispersion wavelength of the optical fiber obtained from the optical fiber preform of comparative examples 1 and 2 is 1318.9 nm or more, indicating that the optical properties are inferior to those of exemplary embodiments 1 to 4.

TABLE 1

| | Flow rate ratio of carrier gas Ar to Si | Flow rate ratio of sealing gas Ar to Si | $r_{side}/r_{core}$ | Mode field diameter (μm) | Zero-dispersion wavelength (nm) |
|---|---|---|---|---|---|
| Example Embodiment 1 | 0.59 | 2.3 | 0.745 | 9.13 | 1318.1 |
| Example Embodiment 2 | 0.73 | 2.5 | 0.831 | 9.15 | 1317.8 |
| Example Embodiment 3 | 0.39 | 1.5 | 0.767 | 9.17 | 1318.3 |
| Example Embodiment 4 | 0.43 | 1.6 | 0.809 | 9.09 | 1317.5 |
| Comparative Example 1 | 0.79 | 2.7 | 0.660 | 9.12 | 1319.1 |
| Comparative Example 2 | 0.82 | 5.9 | 0.703 | 9.11 | 1318.9 |

What is claimed is:

1. An optical fiber preform, comprising a core glass rod consisting of:
   a core portion; and
   a clad portion,
   the core portion having a first refractive index and the clad portion having a second refractive index lower than the first refractive index of the core portion,
   wherein a radial position having a value of 45% of a refractive index difference between a center of the core portion and the clad portion is a boundary $r_{core}$ (mm) between the core portion and the clad portion;
   an outer diameter of the core glass rod is 104 mm, 107 mm, 108 mm or 110 mm; and
   when a radius position r at which a refractive index difference with the clad portion being a maximum value is $r_{side}$ (mm), $r_{side}/r_{core}$ is between 0.745 and 1.

2. The optical fiber preform according to claim 1, wherein a difference between the refractive index difference between the center of the core portion and the clad portion, and a refractive index difference between $r_{side}$ and the clad portion is 4.6% or less of a refractive index difference between the center of the core portion and the clad portion.

3. The optical fiber preform according to claim 1, wherein the second refractive index of the clad portion is a refractive index at a position of 47.5% of an outer diameter of the optical fiber preform.

4. An optical fiber made by wire drawing from the optical fiber preform according to claim 1.

5. The optical fiber according to claim 4, wherein a zero dispersion wavelength is 1318.9 nm or less.

* * * * *